US005895091A

United States Patent [19]

Welsh, Jr.

[11] Patent Number: 5,895,091

[45] Date of Patent: Apr. 20, 1999

[54] SHIELD ADJUSTING DEVICE

[75] Inventor: Thomas J. Welsh, Jr., Naperville, Ill.

[73] Assignee: Kolcraft Enterprises, Inc., Chicago, Ill.

[21] Appl. No.: 08/950,868

[22] Filed: Oct. 15, 1997

[51] Int. Cl.[6] .............................. A47D 1/10

[52] U.S. Cl. .............................. 297/256.15; 297/488

[58] Field of Search .............................. 297/487, 488, 297/216.11, 205.1, 256.15, 183.3, 183.4

[56] References Cited

U.S. PATENT DOCUMENTS

| | | | |
|---|---|---|---|
| 3,762,768 | 10/1973 | Hyde et al. | 297/253 |
| 4,186,962 | 2/1980 | Meeker | 297/250 |
| 4,230,366 | 10/1980 | Ruda | 297/487 |
| 4,231,612 | 11/1980 | Meeker | 297/250 |
| 4,343,510 | 8/1982 | Cone | 297/250 |
| 4,376,551 | 3/1983 | Cone | 297/250 |
| 4,596,420 | 6/1986 | Vaidya | 297/233 |
| 4,770,468 | 9/1988 | Shubin | 297/487 |
| 4,826,246 | 5/1989 | Meeker | 257/250 |
| 4,858,997 | 8/1989 | Shubin | 297/487 |
| 4,900,086 | 2/1990 | Steward | 297/238 |
| 4,912,818 | 4/1990 | Meeker | 24/170 |
| 4,986,599 | 1/1991 | Wise | 297/183.3 |
| 4,986,600 | 1/1991 | Leblanc et al. | 297/238 |
| 5,106,154 | 4/1992 | Kain | 297/250 |
| 5,181,761 | 1/1993 | Meeker | 297/250 |
| 5,427,432 | 6/1995 | Meeker et al. | 297/256.15 |
| 5,533,786 | 7/1996 | Cone, II | 297/256.15 |
| 5,607,203 | 3/1997 | Sedlack | 297/256.15 |
| 5,664,833 | 9/1997 | Celestina-Krevh et al. | 297/256.15 |
| 5,683,138 | 11/1997 | Ward, Jr. et al. | 297/256.15 |

OTHER PUBLICATIONS

1995 Evenflo Juvenile Furniture Company, Inc., catalog pp. 2–3, Ultara I Premier Car Seat With Adjust–A–Shield.

1995 Century Products Company, catalog pp. 12–15, re: convertible car seats.

1995 Cosco Inc., catalog pp. 4–6, re: car seats with shields.

1996 Century Products Company, catalog pages re: Room–To–Grow™ Convertible Car Seat/Shield.

*Primary Examiner*—Milton Nelson, Jr.

*Attorney, Agent, or Firm*—Marshall, O'Toole, Gerstein, Murray & Borun

[57] ABSTRACT

A child car seat having at least one adjustment assembly for adjusting a child seat shield relative to the seat. The assembly includes a biased finger bar attached to a slide member which is slidably mounted on a mounted member pivotally attached to the seat shell. A shield leg is pivotally attached to the mounting member. The finger bar can be actuated to cause a lock key either to engage or disengage from a plurality of openings located in an adjuster plate pivotally mounted to the seat shell.

9 Claims, 5 Drawing Sheets

10
72
74
68
13
3 2
67
46
71
31
10

7
55'
56
52
50

44
69
13
74
72
46
48
7

81
82
50
100
3
2
1
74
84
84
85
72
28

55'
82
81
50
57
63
100
68
62
85
46
44
28
67
48

52
50
73
71
3 2 1
84
85
61
59
31

50
71
3 2 1
84
85
73
59
31

50
3 2 1
85
85
84
73
85

71
61
59
31

81
82
52
56
55'
100
80
50
70
69
46
70'
74
44
72
73
66
57
71
13
61
60
59
53
91
28
31
48
32
58

100
50
52
55'
84
71
66
72
46
68
61
70
44
69
53
59
63
60
54
64
55
58
95
97
94
48
96
92
90
93
48

SHIELD ADJUSTING DEVICE

BACKGROUND OF THE INVENTION

The invention disclosed and claimed herein relates generally to a restraint system for a child car seat and more particularly to a car seat shield member adapted to be adjustably positioned with respect to a car seat.

DESCRIPTION OF PRIOR ART

There are presently available in the art car seats which are used to restrain and transport an infant or toddler in a moving vehicle. The seat faces forward when a toddler is disposed in it and faces rearward when an infant is disposed in the seat. As used herein, the term child car seat is intended to mean a seat which can be utilized for either a toddler or an infant. The child car seat is attached to the seat of a vehicle such as an automobile with the child being placed in the seat. A seat shield member is positioned in front of the child to further restrain and shield the infant or toddler. The shield is somewhat of a U-shaped member comprising a base and legs extending outward from the base. The base traverses the car seat while the outboard ends of each leg pivotally connect to the sides of the seat. In some instances, the shield member is an adjustable assembly serving to adjust for the growth of a child and to accommodate various clothing changes, e.g., a child wearing a snowsuit as opposed to a summer outfit. An example of such an assembly is disclosed in U.S. patent application Ser. No. 08/556,305, filed Nov. 13, 1995 and assigned to the same assignee of the present invention. Another example, which includes a U-shaped base member, is telescopingly received within two pivotable legs extending outward from the seat. Spring biased button members can be actuated to position the base member relative to the legs.

In this particular embodiment, the adjusting system is located on the legs of the shield member which is not entirely satisfactory in that the location of the adjustment system is considered too close to a child. Moreover, it is not desired to have the shield member made of a plurality of components. What is desired is to have a one-piece shield member as opposed to a multiple-piece member. It also is desired to have a system for adjusting the one-piece shield member where the adjustment system is located away from a child disposed in a child car seat. Further, it is desired to have a shield member which can be adjustably positioned to increase or reduce the distance the base of the shield member may swing in an arcuate direction whereby a child may be relatively easily placed in or removed from a child car seat or restraint system.

SUMMARY OF THE INVENTION

The invention disclosed and claimed herein serves to obviate problems and concerns associated with prior art child seat systems utilizing shield members, while at the same time achieving the desired advantages sought for a child car seat having a shield member.

Briefly, the present invention relates to a child car seat comprising a conventional child car seat which includes a molded one-piece plastic shell. pivotable shield member is fastened to the sides of the shell through an adjusting mechanism or assembly. The shield member preferably comprises a one-piece U-shaped member comprising a base which traverses the shell and two legs which extend outward from the base. The outboard end of at least one leg is adapted to be pivotally connected to an adjustment assembly which, in turn, is pivotally connected to a side of the shell. The outboard end of the remaining leg is pivotally connected to a shell side.

The adjustment assembly provides for the shield member to be adjustably positioned in a number of positions relative to an infant or toddler positioned in the car seat.

An adjustment assembly includes a mounting member pivotally connected to the seat shell. First and second slide members are adapted to slide along the mounting member and pivotally engage and lock a shield member leg to the assembly. A biased, finger actuated adjustment bar is joined to the first slide member. A lock key is attached to the bar. An adjuster plate also is pivotally mounted to the shell seat independent of the mounting member so that the adjuster bar moves relative to the adjuster plate. The adjuster plate includes a plurality of spaced, numbered slots or lock stops. In use, an individual can press down on the biased adjustment bar whereby the lock key is disengaged from a first slot on the adjuster plate. While depressed, the adjuster bar is moved to a new position relative to the adjuster plate. Upon release of the adjuster bar, the lock key enters into another slot thereby positioning the shield in a new position relative to the child car seat shell.

The geometry of the shield member is such that while allowing maximum space for a child seated in the child car seat, the shield can be adjusted to take up a relatively minimal space when rotated about the car seat which is desirable particularly in smaller cars.

DETAILED DESCRIPTION

Figure 1:
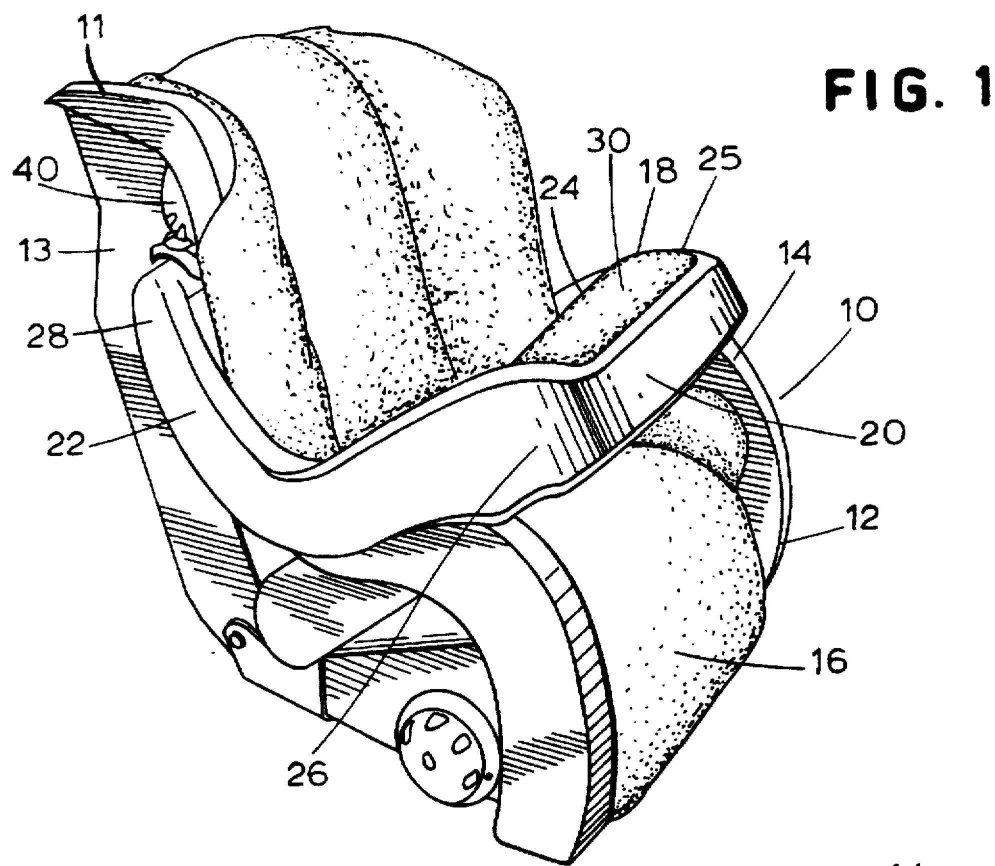
FIG. 1 shows a perspective view of the child car seat and adjustable shield of the present invention.

Referring to the drawings, FIG. 1 shows a conventional child car seat 10 which includes head end 11, foot end 12, and sides 13, 14 which define a seat for receipt of a conventional cloth or cushion seat 16. Restraint belts generally employed with a child car seat have not been shown. Seat 10 is provided with a pivotable shield member 18.

Shield member 18 preferably is a one-piece, U shape-like member and includes base 20, which traverses the width of seat 10, and legs 22, 24. Leg 22 includes a first end 26, which terminates as one end of base 20, and a remaining outboard end 28. Similarly, leg 24 also has two ends; one end 25, which terminates as the remaining end of base member 20, and an outboard end which corresponds to leg end 28.

Shield member 18 is a one-piece member, preferably, a blow molded or injection molded plastic material such as polypropylene or polyethylene. If desired, a cloth or fabric cushioning material 30 can be disposed about all or a portion of base 20. Shield legs 22, 24 generally are curved as shown in FIG. 1, or shaped as required or desired for a particular seat configuration.

Figure 10:
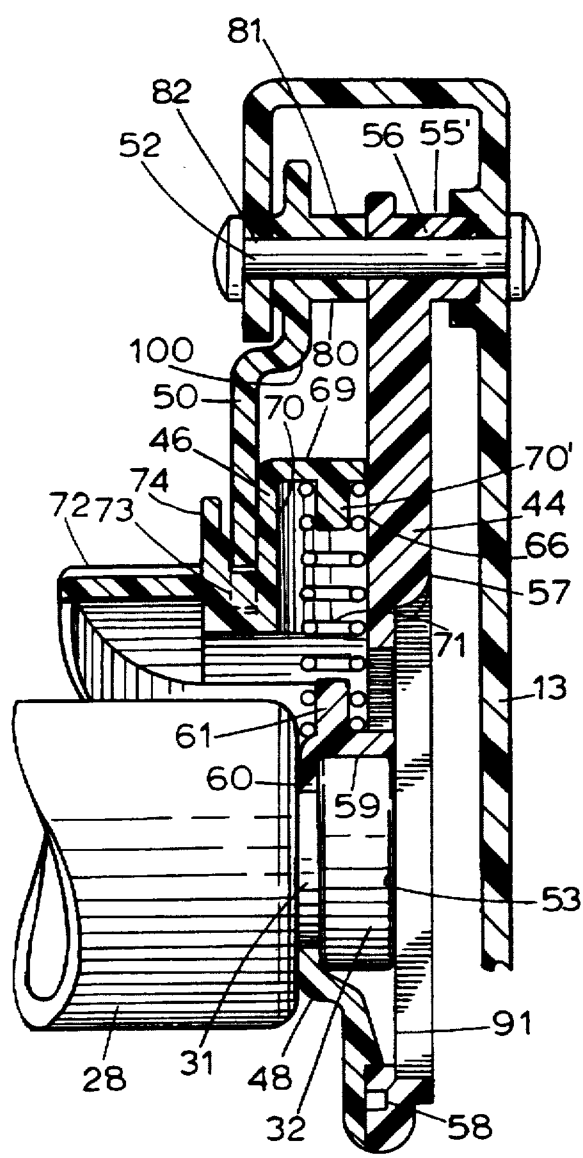
FIG. 10 shows a side section view taken along lines 10—10 in FIG. 3; and, FIG. 11 shows an exploded perspective view of the components forming the shield adjusting assembly of the present invention.

Turning to FIGS. 1 and 10, for example, the outboard end 28 of leg 22 includes neck 31 and collar 32 which are disposed perpendicular to leg 22.

As seen in FIG. 10, the diameter of neck 31 is substantially reduced relative to the diameter of leg end 28 whereas collar 32 has a diameter which is greater than the diameter of neck 31 but preferably less than the diameter of leg end 28.

Leg 24 also includes a corresponding neck and collar having a structure which corresponds with the structure of collar 32 and neck 31.

Adjustment assembly 40 is comprised of a number of components. The assembly connects leg 22 to the shield in the manner to be described. If desired, another adjustment assembly, which is a mirror copy of assembly 41, may be disposed between leg 24 and shield side 14. One lock assembly is required to provide the desired adjustment between the shield and seat; such that, if desired, assembly 40 will be utilized whereas leg 14 will be pivotally connected by its neck and collar to shell side 14.

Figure 4:
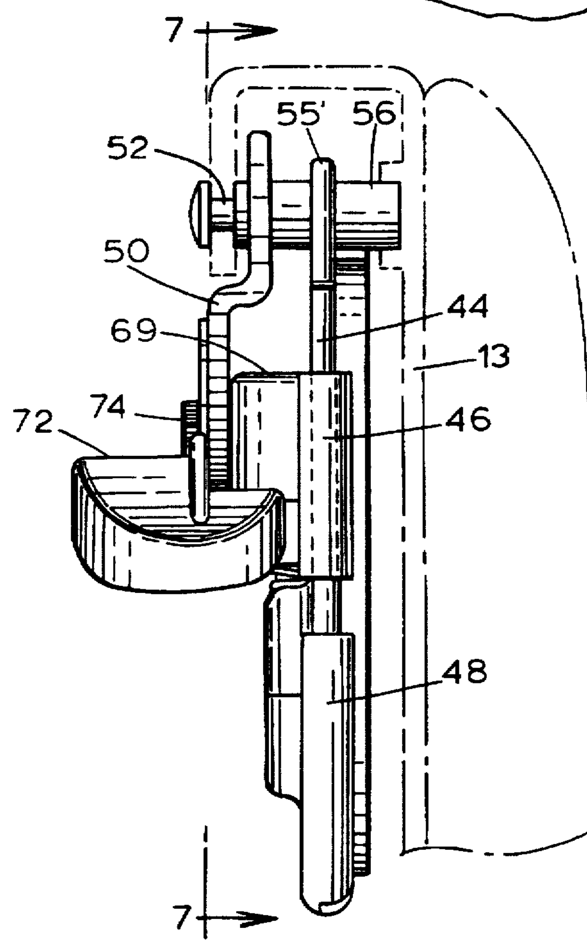
FIG. 4 shows a side view of the shield adjustment assembly of FIG. 3.
Figure 5:
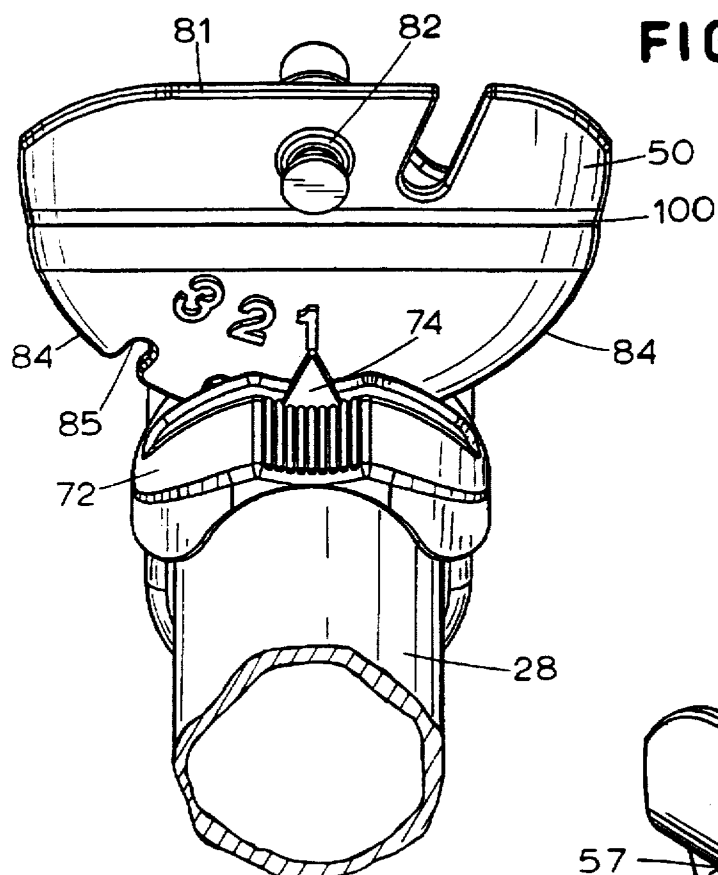
FIG. 5 shows a perspective front view of the shield adjustment assembly of the present invention.

Adjustment assembly 40 comprises elongated mounting member 44, first and second slide members 46, 48 and adjuster plate 50. Mounting member 44 and adjuster plate 50 each are pivotally connected to pin 52 which is fastened to seat side 13 which, as illustrated in FIG. 4, is formed in an inverted U shape whereby each end of pin 52 is fastened to the shell.

Figure 11:
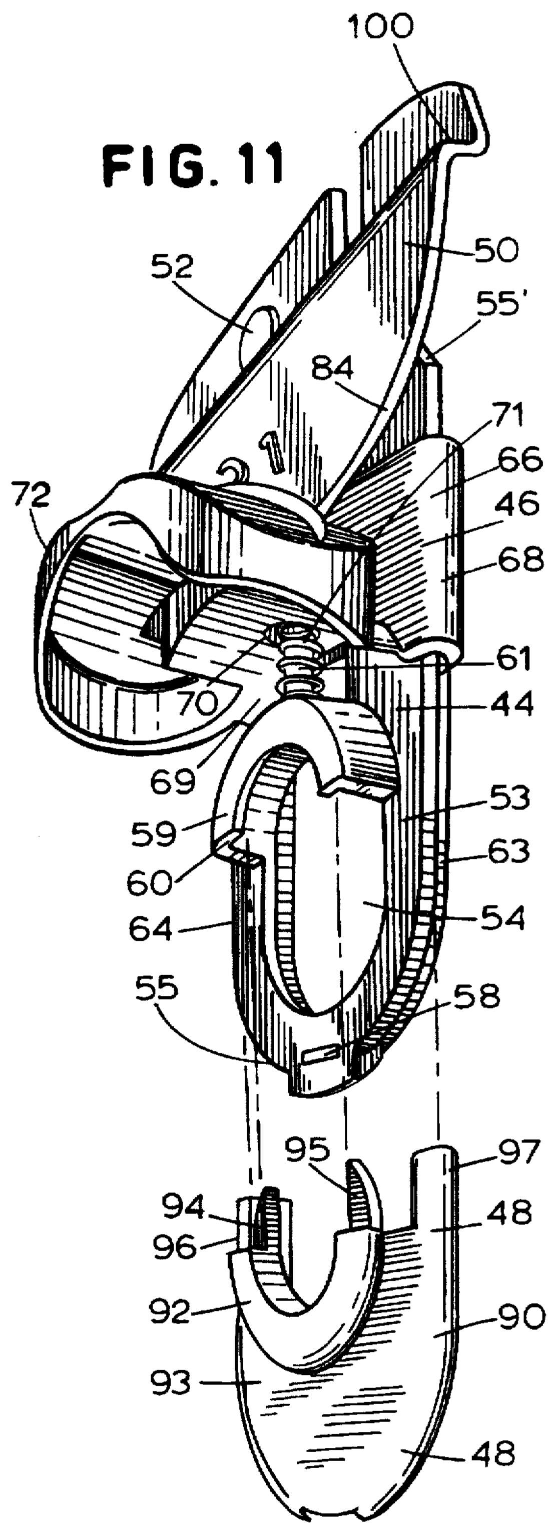

As illustrated in FIG. 11, for example, mounting member 44 is a substantially flat elongated member having a flat face 53 and an elliptically shaped opening 54 disposed near the bottom or first end 55. A boss 56, FIG. 10, is located at the opposite remaining end 55'. A lock recess 58 is located on face 53 contiguous to opening 54. A curved bracket 59 having a flange 60 is positioned adjacent one end of opening 54. A spring mounting post 61 is disposed on top of bracket 59. The sides 62, 63 of member 44 are adapted to serve as tracks for slide members 46, 48.

Figure 6:
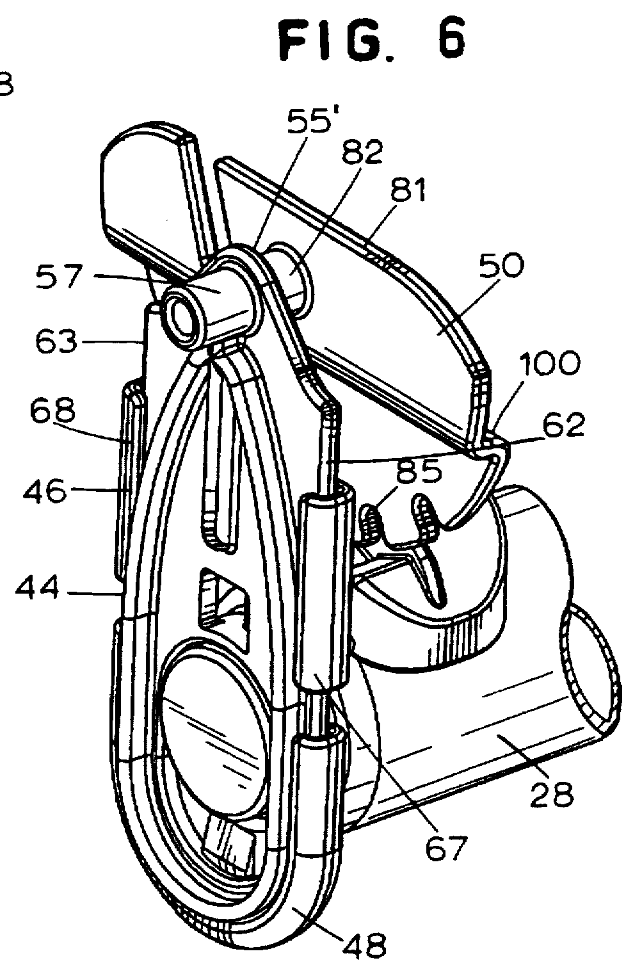
FIG. 6 shows a rear perspective view of the shield adjustment assembly illustrated in FIG. 5.

First slide member 46 is mounted and slidable on mounting member 44. Slide member 44 includes a flat section 66 adapted to be contiguous to mounting member face 53. Each side of flat section 66 is formed to include a peripheral carriage 67, 68 (FIG. 6). Carriage 67 is adapted to slide on track 62 whereas carriage 68 is adapted to slide along track 63.

Slide member 46 also includes a spring housing 69 having a partial vertical housing 70 having an internal post 70' for receipt of helical compression spring 71.

A curved finger bar 72 also is fixed to and extends from flat section 66 and projects outwardly from housing 70. A lock key 73 in the form of a tab is fixed to and spaced between housing 70 and finger bar 72. An arrow indicator 74 is attached to and extends upward from finger bar 72. One end of spring 71 is adapted to seat on mounting member post 61 whereas the remaining spring end is received in post 70' located within housing 70.

Adjuster plate 50 has a boss 80 at end 81. Opening 82 extends through boss 80 such that plate 50 can be pivotally mounted on pin 52. The opposite end 84 of plate 50 is curved and includes a plurality of spaced notches or lock stops 85 located below the numbers "1," "2," and "3." Each notch is adapted to receive lock key 73.

Second slide member 48 also is adapted to slide on and lock to mounting member 44. As illustrated in FIG. 11, member 48 comprises a flat section 90 having a face 91 adapted to be contiguous to flat face 53. Second slide member 48 also includes a curved bracket 92 projecting outward from face 93. Arcuate shaped locking projections 94, 95 project outwardly from bracket 92 and are adapted to be received within flange 60 of mounting member 44. Second slide member 48 also includes a pair of carriages 96, 97 located along the sides of member 44, the carriages being engageable with the respective sides 62, 63 of member 44.

In assembly, leg end 28 is disposed in opening 54 of mounting member 44 so that collar 32 is disposed within bracket 59 and flange 60 is positioned at the location of neck 31 thereby capturing shield leg 22 in member 44. The neck and collar of leg 24 can either be connected to an identical adjustment assembly or, if desired, the neck and collar can be pivotally connected in a suitable opening in shell side 14.

Second member 48 slides onto member 44 with its carriages 96, 97 engaging tracks 63, 64. Projections 94, 95 slide into bracket 59 below flange 60 so that bracket 92 on member 48 abuts bracket 59 on member 44.

First slide member 46 is disposed on mounting member 44 with carriage 67 engaging track 62 and carriage 68 engaging track 63.

One end of spring 71 is seated in post 70' of housing opening 70 while the remaining spring end seats on post 61 on member 44.

Figure 2:
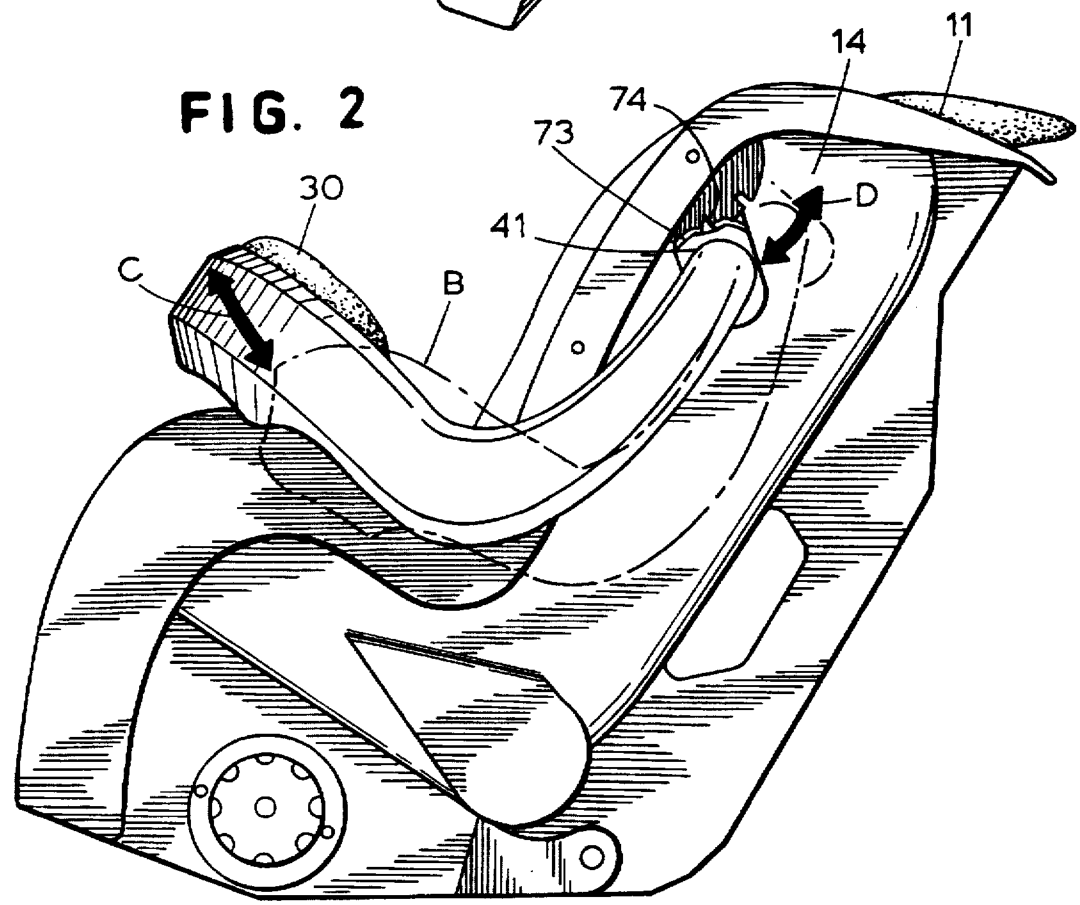
FIG. 2 shows a side view of the child car seat of FIG. 1 with the shield being illustrated in different, adjusted positions.
Figure 3:
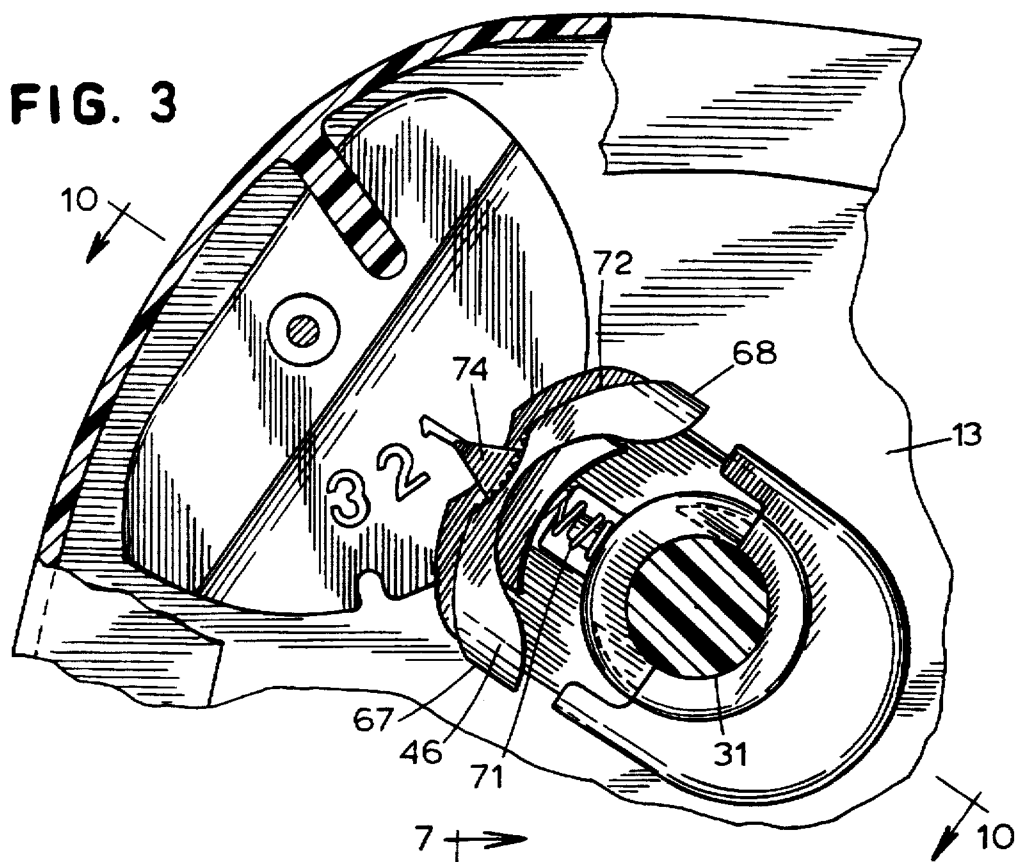
FIG. 3 shows a fragmentary side view of the shield adjustment assembly.
Figure 7:
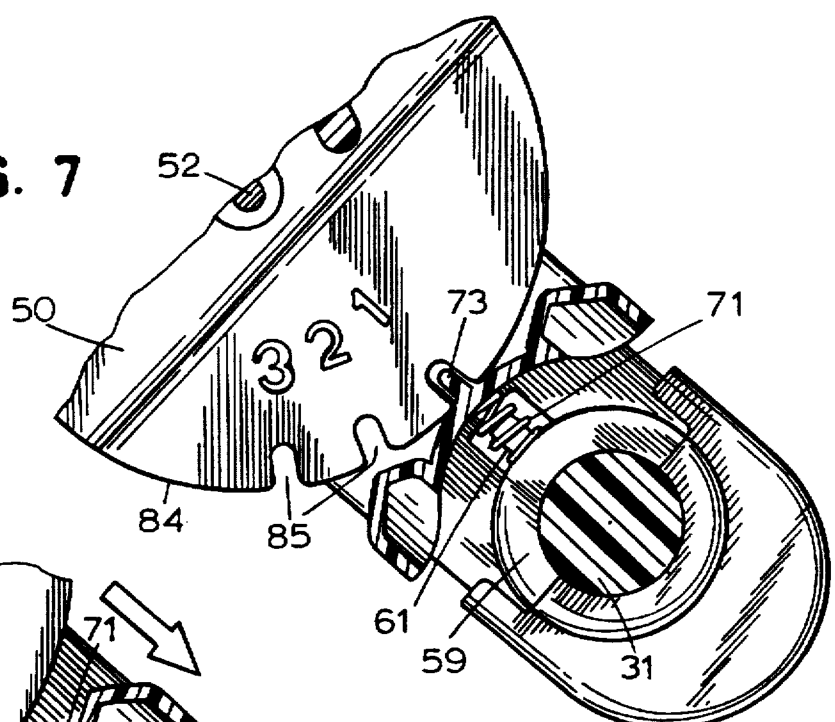
FIG. 7 shows a section view taken along lines 7—7 in FIG. 4 with the finger activated bar broken away and the lock key disposed in a locking plate slot #1.
Figure 8:
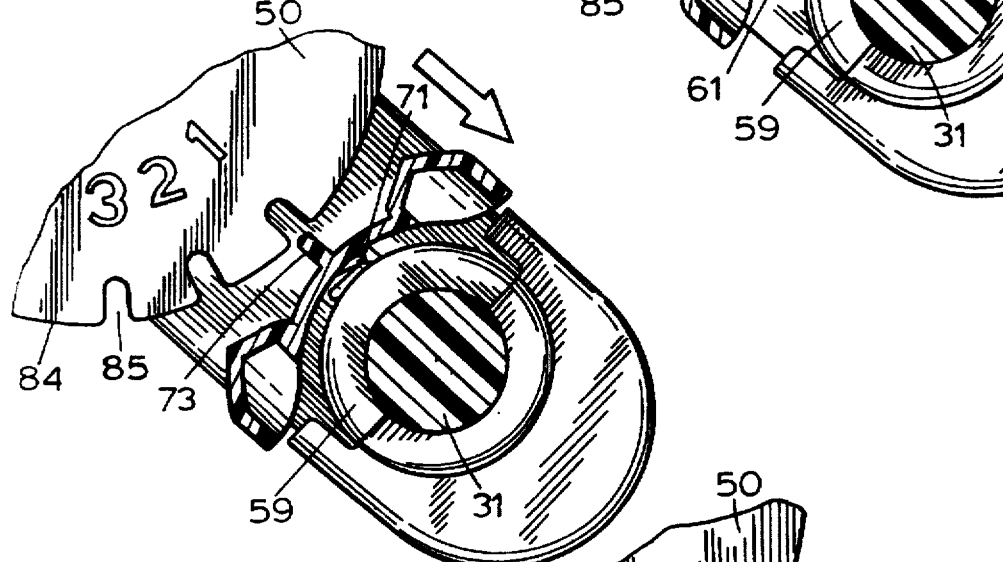
FIG. 8 shows the view of FIG. 7 with the finger activated bar in a depressed position and the lock key disengaged from the lock plate slot.
Figure 9:
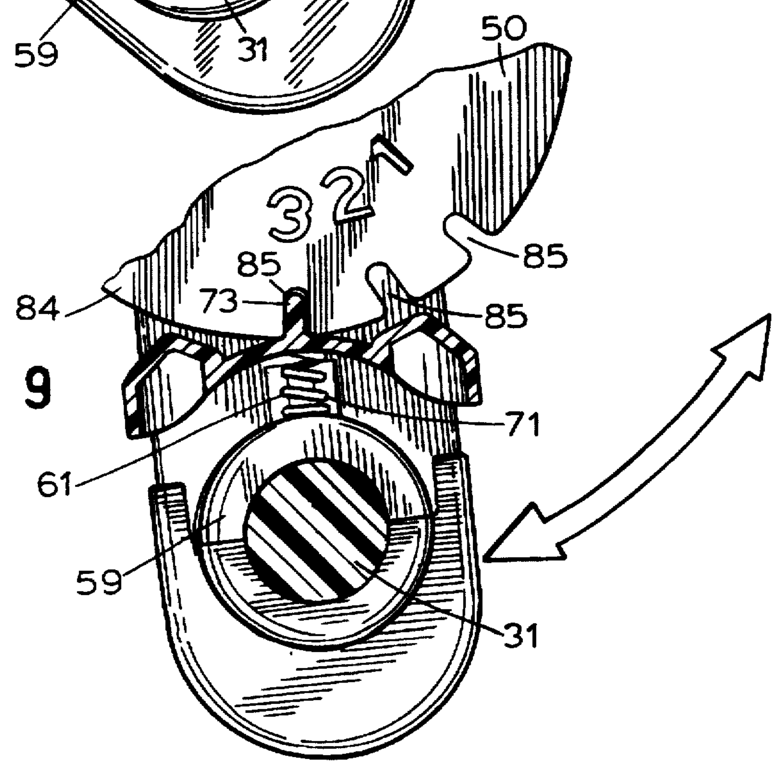
FIG. 9 shows the lock key of FIG. 7 and adjusted to a new position with the lock key disposed in lock plate slot #3.

Adjuster plate 50 is connected to and depends from pin 52 such that a notch 85 in plate 50 receives lock key 73 thereby maintaining mounting member 44 in a first position relative to adjuster plate 50 as shown in FIG. 2. When it is desired to move the shield to a second position such as illustrated by the dotted lines designated "B" in FIG. 2, one presses down finger bar 72 on member 46 thereby compressing spring 71 from its position illustrated in FIG. 7 to the position for member 46 illustrated in FIG. 8. In the position shown in FIG. 8, mounting member 46 can be pivoted relative to adjuster plate 50 from a position marked "1" to a position marked "2" or "3" at which time, finger bar 50 is released by an individual and lock key 73 enters notch or lock stop 85 located at position "3" in FIG. 9 such that the shield member 18 has been moved a distance illustrated by the arrow "C" in FIG. 2. The adjustment assembly 40 has moved a distance "D" as illustrated in FIG. 2. Thus, one can adjust the position of the shield by selectively moving and maintaining member 44 relative to adjuster plate 50.

The sole means for adjusting the location of the shield member relative to the seat is at the location of adjustment assembly 40 attached to one or both sides of the child car seat.

Preferably, mounting member 44, first and second slide members 46, 48 and adjuster plate 50 are molded plastic members. The seat shield also is a molded one-piece member in that the base and legs are molded together as an integral one-piece unit.

Thus, mounting member 44 can be relatively easily moved from, for example, a position marked "1" to a position marked "2" or "3" relative to adjuster plate 50 by pressing down on or releasing finger bar 72.

Finally, to prevent or substantially limit rotational movement of the plate 50, the adjuster plate is preferably offset at 100 so that if a rotational force is applied to plate 50, plate 50 will engage the housing 70.

While the present invention has been described in connection with a single embodiment, it will be understood to those skilled in the art that many changes and modifications may be made without departing from the true spirit and scope of the invention. It is therefore intended by the appended claims to cover all such changes and modifications which come within the true spirit and scope of the invention.

What is claimed is:

1. A child car seat comprising:

a head end, a foot end and spaced sides to define a child seat;

a shield member comprising a base which traverses said seat and two legs extending outwardly from said base;

each leg having an outboard end;

an adjustment assembly connecting at least one of said legs to a seat side;

said assembly comprising:

a mounting member having two ends, a first one of said ends being pivotally connected to said seat and a second one of said ends being connected to one of said legs of said shield;

a first slide member slidably mounted on said mounting member and including a biased locking bar and a locking key;

an adjuster plate connected to said seat side and including at least two slots, each slot being configured to receive said locking key;

whereby said locking key, upon movement of said biased locking bar away from said plate can be removed from one slot on said plate and said mounting member moved to a second position where, upon release of said biased locking bar, said locking key will enter said second slot where said mounting member is maintained in fixed position with respect to said adjuster plate.

2. A child car seat in accordance with claim 1 and further including a second slide member having a bracket for engagement with said leg;

said second slide member being mounted on said mounting member to lock said leg to said assembly.

3. A child car seat in accordance with claim 1 wherein said mounting member further includes a spring mounting post and said first slide member includes a housing having an opening therein; and a compression spring having two ends, a first end of said spring being mounted on said post and a second end of said spring being disposed in said housing to bias said first slide member away from said mounting member.

4. A child car seat as defined in claim 1 wherein a second adjustment assembly identical to said adjustment assembly connects the outboard end of a second one of said legs to a second one of said seat sides.

5. For use with a child car seat including: (a) a head end, a foot end and spaced seat sides together defining a child seat; and (b) a shield member comprising a base which traverses said seat and two legs extending outwardly from said base, each leg having an outboard end; an adjustment assembly comprising:

a mounting member for pivotally connecting to a first one of said seat sides, the mounting member being configured to secure the outboard end of a first one of said legs;

a first slide member slidably mounted on said mounting member, said first slide member including a finger bar and a lock member biased for movement with respect to said mounting member;

an adjuster plate configured to be connected to said seat side and further including a plurality of openings therein, each opening being adapted to receive said lock member;

said first slide member being slidable upon said mounting member, wherein, upon actuation of said biased finger bar to remove said lock member from a first one of said openings in said adjuster plate, said mounting member can be pivoted relative to said adjuster plate such that said lock member engages a second one of said openings when said finger bar is released and said second opening and said lock member are aligned.

6. An adjustment assembly as defined in claim 5 wherein said mounting member further includes a spring mounting post and said first slide member includes a housing having an opening therein; and a compression spring having two ends, a first end of said spring being mounted on said post and a second end of said spring being disposed in said housing to bias said first slide member away from said mounting member.

7. An adjustment assembly as defined in claim 5 and further including a second slide member mounted on said mounting member and engageable with said first slide member to connect said outboard end of said first shield leg to said assembly.

8. An adjustment assembly as defined in claims 5 or 7 wherein a second adjustment assembly identical to said adjustment assembly is provided to connect the outboard end of a second one of said legs to a second one of said seat sides.

9. A method of adjusting a position of a child seat shield relative to a child seat shell in which the shield comprises a base member and a pair of spaced legs with at least one of said legs being connected to an adjusting assembly which includes a mounting member pivotally connected to said shell and having a first slidable member disposed thereon, said first member having a finger depression bar and a locking key, and an adjuster plate having spaced lock key receiving openings thereon, said first slidable member being biased with respect to said mounting member, said method comprising the steps of:

(i) depressing said finger bar whereby said lock key is disengaged from a first one of said lock key openings;

(ii) moving said mounting member relative to said adjuster plate such that said lock key is aligned with a second one of said lock key receiving openings; and, (iii) releasing said finger bar so that said lock key enters said aligned second lock key opening thereby locking said mounting member relative to said adjuster plate.

* * * * *